(12) United States Patent
Gupta et al.

(10) Patent No.: US 11,500,840 B2
(45) Date of Patent: Nov. 15, 2022

(54) CONTRASTING DOCUMENT-EMBEDDED STRUCTURED DATA AND GENERATING SUMMARIES THEREOF

(71) Applicant: International Business Machines Corporation, Armonk, NY (US)

(72) Inventors: Ankush Gupta, New Delhi (IN); Vitobha Munigala, Bangalore (IN); Arvind Agarwal, New Delhi (IN); Shanmukha Chaitany Guttula, Bangalore (IN); Mitesh H. Vasa, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 16/804,399

(22) Filed: Feb. 28, 2020

(65) Prior Publication Data
US 2021/0271654 A1   Sep. 2, 2021

(51) Int. Cl.
*G06F 16/22* (2019.01)
*G06F 16/383* (2019.01)
(Continued)

(52) U.S. Cl.
CPC ...... *G06F 16/2228* (2019.01); *G06F 16/2282* (2019.01); *G06F 16/24573* (2019.01);
(Continued)

(58) Field of Classification Search
CPC .......... G06F 16/2228; G06F 16/24573; G06F 16/26; G06F 16/2282; G06F 16/383
See application file for complete search history.

(56) References Cited

U.S. PATENT DOCUMENTS

| 1,053,761 A | * | 2/1913 | Washburn | C05F 3/00 71/22 |
| 5,819,268 A | | 10/1998 | Hackett | |

(Continued)

FOREIGN PATENT DOCUMENTS

| WO | WO2016009321 A1 | * | 1/2016 |
| WO | WO2916009321 | * | 1/2016 |

OTHER PUBLICATIONS

Friston et al., Statistical Parametric Maps in Functional Imaging: A General Linear Approach; Wiliey-Liss, 1995.*
(Continued)

*Primary Examiner* — Daniel A Kuddus
(74) *Attorney, Agent, or Firm* — Ryan, Mason & Lewis, LLP

(57) ABSTRACT

Methods, systems, and computer program products for contrasting document-embedded structured data and generating summaries thereof are provided herein. A computer-implemented method includes extracting two or more tables from two or more input documents, wherein each of the two or more input documents comprises structured data and unstructured data; normalizing the two or more extracted tables using one or more alignment techniques; determining at least one of (i) one or more differences and (ii) one or more similarities across the two or more extracted tables by performing a comparison of the two or more normalized tables; deriving one or more insights from the comparison by applying at least one analytical model to the at least one of the one or more determined differences and one or more determined similarities; and outputting at least a portion of the one or more insights to at least one user.

8 Claims, 6 Drawing Sheets

(51) Int. Cl.
*G06K 9/62* (2022.01)
*G06F 16/26* (2019.01)
*G06F 16/2457* (2019.01)

(52) U.S. Cl.
CPC ............ *G06F 16/26* (2019.01); *G06F 16/383* (2019.01); *G06K 9/6215* (2013.01)

(56) References Cited

U.S. PATENT DOCUMENTS

| | | | |
|---|---|---|---|
| 5,974,574 A | 10/1999 | Lennie et al. | |
| 7,054,891 B2 | 5/2006 | Cole | |
| 7,668,849 B1 | 2/2010 | Narancic et al. | |
| 7,849,048 B2 | 12/2010 | Langseth et al. | |
| 8,024,327 B2* | 9/2011 | Tunkelang ............ | G06F 16/245 707/722 |
| 8,051,073 B2* | 11/2011 | Tunkelang .......... | G06F 16/3331 707/722 |
| 9,576,023 B2* | 2/2017 | Franceschini ....... | G06F 16/3344 |
| 9,600,513 B2 | 3/2017 | Bourbonnais et al. | |
| 9,734,196 B2* | 8/2017 | Franceschini ....... | G06F 16/3344 |
| 9,798,818 B2* | 10/2017 | Ho ...................... | G06F 16/3347 |
| 2006/0047636 A1* | 3/2006 | Mohania ................ | G06F 16/20 |
| 2007/0011134 A1* | 1/2007 | Langseth .............. | G06F 16/254 |
| 2009/0171959 A1 | 7/2009 | Xu et al. | |
| 2010/0174678 A1 | 7/2010 | Massand | |
| 2012/0278321 A1* | 11/2012 | Traub .................. | G06F 16/3331 707/736 |
| 2016/0012044 A1* | 1/2016 | Franceschini ......... | G06F 16/951 707/722 |
| 2016/0012045 A1* | 1/2016 | Franceschini ....... | G06F 16/3344 707/728 |
| 2016/0012057 A1* | 1/2016 | Franceschini ....... | G06F 16/9024 707/730 |
| 2016/0012106 A1* | 1/2016 | Franceschini ....... | G06F 16/3344 707/728 |
| 2016/0012122 A1* | 1/2016 | Franceschini .......... | G06N 5/025 707/739 |
| 2016/0012336 A1* | 1/2016 | Franceschini ....... | G06F 16/3334 706/55 |
| 2016/0063097 A1* | 3/2016 | Brown ................. | G06K 9/6254 707/737 |
| 2019/0073415 A1* | 3/2019 | Franceschini ....... | G06F 16/3346 |

OTHER PUBLICATIONS

Arasu et al., Extracting Structured Data from Web Pages, SIGMOD, Jun. 12, 2003.

Zhang et al., Character-level Convolution Networks for Test Classification, 2015.

Joulin et al., Bag of Tricks for Efficient Text Classification, Aug. 9, 2016.

Wikipedia, WordNet, https://en.wikipedia.org/w/index.php?title=WordNet&oldid=938981851, Feb. 3, 2020.

* cited by examiner

CONTRASTING DOCUMENT-EMBEDDED STRUCTURED DATA AND GENERATING SUMMARIES THEREOF

FIELD

The present application generally relates to information technology and, more particularly, to data analysis.

BACKGROUND

Enterprise data commonly include a variety of documents such as regulations, contracts, invoices, etc., which can be updated on a periodic basis. Also, such documents often include unstructured data (such as text) along with structured data (such as tables). Examples of such structured data can include considerable structural variations, presenting challenges for extracting and contextualizing the information contained therein. Further, there is often a need for enterprises to compare data between documents and identify differences. However, conventional document analysis approaches, when comparing documents, typically ignore structured data and/or treat structured data as unstructured data, leading to inaccurate and/or incomplete analyses.

SUMMARY

In one embodiment of the present invention, techniques for contrasting document-embedded structured data and generating summaries thereof are provided. An exemplary computer-implemented method can include extracting two or more tables from two or more input documents, wherein each of the two or more input documents comprises structured data and unstructured data, and normalizing the two or more extracted tables using one or more alignment techniques. Such a method also includes determining at least one of (i) one or more differences and (ii) one or more similarities across the two or more extracted tables by performing a comparison of the two or more normalized tables, deriving one or more insights from the comparison by applying at least one analytical model to the at least one of the one or more determined differences and one or more determined similarities, and outputting at least a portion of the one or more insights to at least one user.

In another embodiment, an exemplary computer-implemented method can include extracting two or more tables from two or more input documents, wherein each of the two or more input documents includes structured data and unstructured data, and wherein extracting includes preserving (i) one or more formatting parameters of each of the two or more extracted tables and (ii) one or more structural parameters of each of the two or more extracted tables. Such a method also includes normalizing the two or more extracted tables by comparing the structured data and the unstructured data across the two or more extracted tables to align the structured data in the two or more extracted tables. Such a method additionally includes determining at least one of (i) one or more differences and (ii) one or more similarities across the two or more extracted tables by performing a comparison of the two or more normalized tables by comparing the two or more normalized tables using multiple measures. Further, such a method includes deriving one or more insights from the comparison by applying at least one analytical model to the at least one of the one or more determined differences and one or more determined similarities, and performing at least one automated action based at least in part on the one or more insights.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes contrasting document-embedded structured data and generating summaries thereof. Accordingly, at least one embodiment includes comparing and contrasting structured data embedded into hybrid documents (i.e., documents with both structured data and unstructured data). Such an embodiment includes extracting tables embedded in hybrid documents as well as extracting parts of text from unstructured data in the documents that is referring or corresponding to the extracted structured data (i.e., tables).

In one or more embodiments, the extracted structured data can be augmented with additional information (e.g., to provide context to the extracted text). Also, such an embodiment additionally includes normalizing extracted data such that the extracted data are mapped to at least one common schema. Accordingly, based on various normalizations (e.g., structure-based normalization and/or value-based normalization), the normalized table data are compared to identify one or more differences and/or similarity across the tables.

Figure 1:
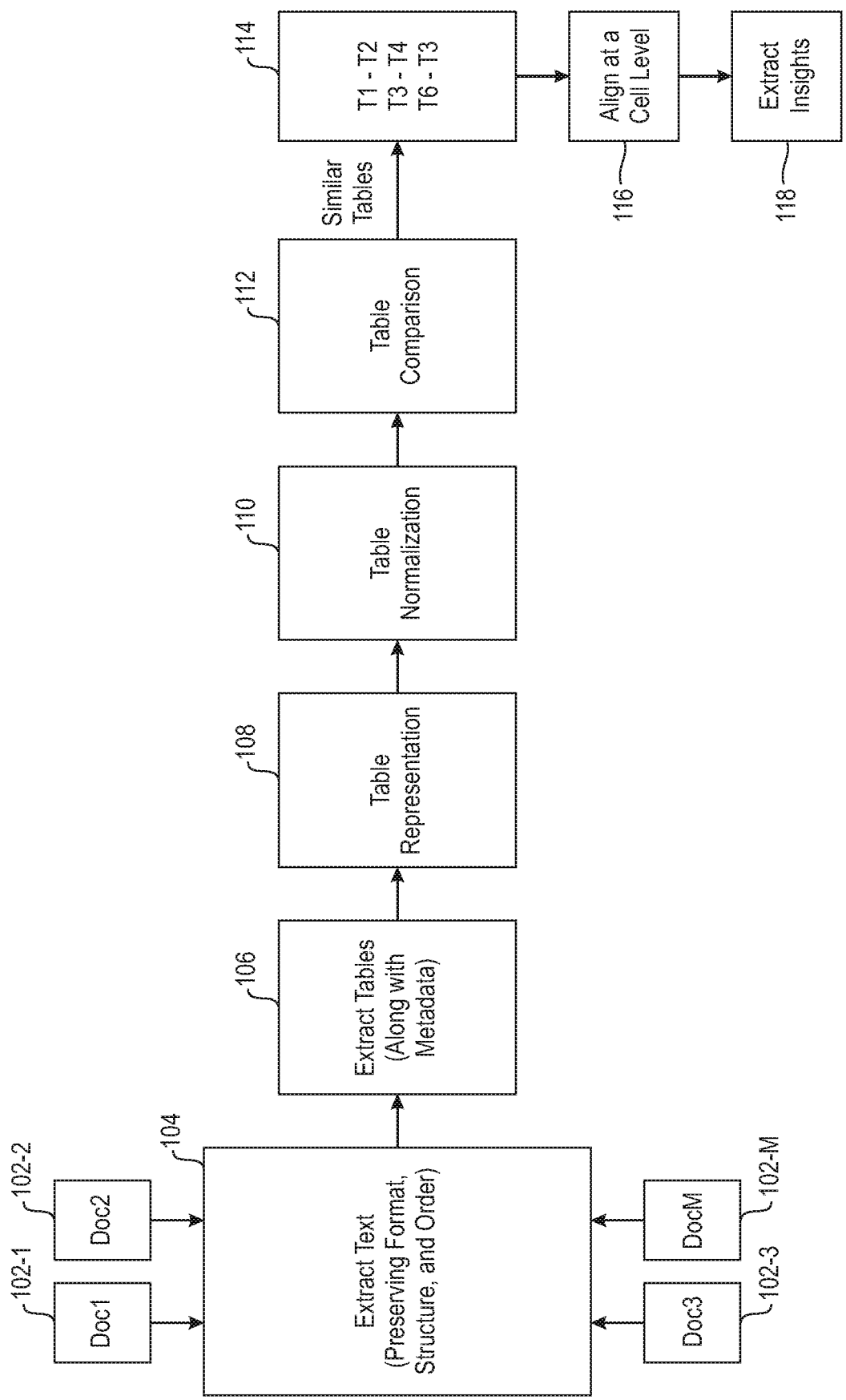
FIG. 1 is a diagram illustrating system architecture, according to an example embodiment of the invention.

FIG. 1 is a diagram illustrating system architecture, according to an embodiment of the invention. By way of illustration, FIG. 1 depicts input documents 102-1, 102-2, 102-3, . . . 102-M (collectively referred to herein as input documents 102), from which text is extracted via component 104 (while preserving format, structure, and order information pertaining to the input documents). When the input documents are provided in formats which are directly not consumable by the program (such as, for example, PDF, DOC, DOCX, etc.), a document format conversion is invoked. In the document conversion, information from the documents are extracted in a way that the document outline remains the same, ordering of content is preserved, and rich formatting such as typography, indentation, bullets, etc., is retained.

From the extracted text, tables (along with related metadata) are extracted via component 106. Using the extracted tables, table representation is carried out via component 108 and table normalization is carried out via component 110. Using the normalized tables, table comparison is carried out via component 112, and similar tables are identified via component 114. The identified (similar) tables are aligned at a cell level via component 116, and insights are extracted via component 118 based at least in part on the aligned tables.

As illustrated in FIG. 1, at least one embodiment includes context-augmented structured data extraction from hybrid documents, which can include the extraction of structured data itself (such as row names, column names, cell values, captions, etc.), as well as relevant unstructured data which serve as context to the identified structured data (e.g., such unstructured data might be in the text, near a table, etc.). As also depicted in FIG. 1, at least one embodiment includes structured data normalization, whereby structured data can be organized into one or more formats and/or representations wherein each record can be in a cell or in a row (of the given table).

Figure 2:
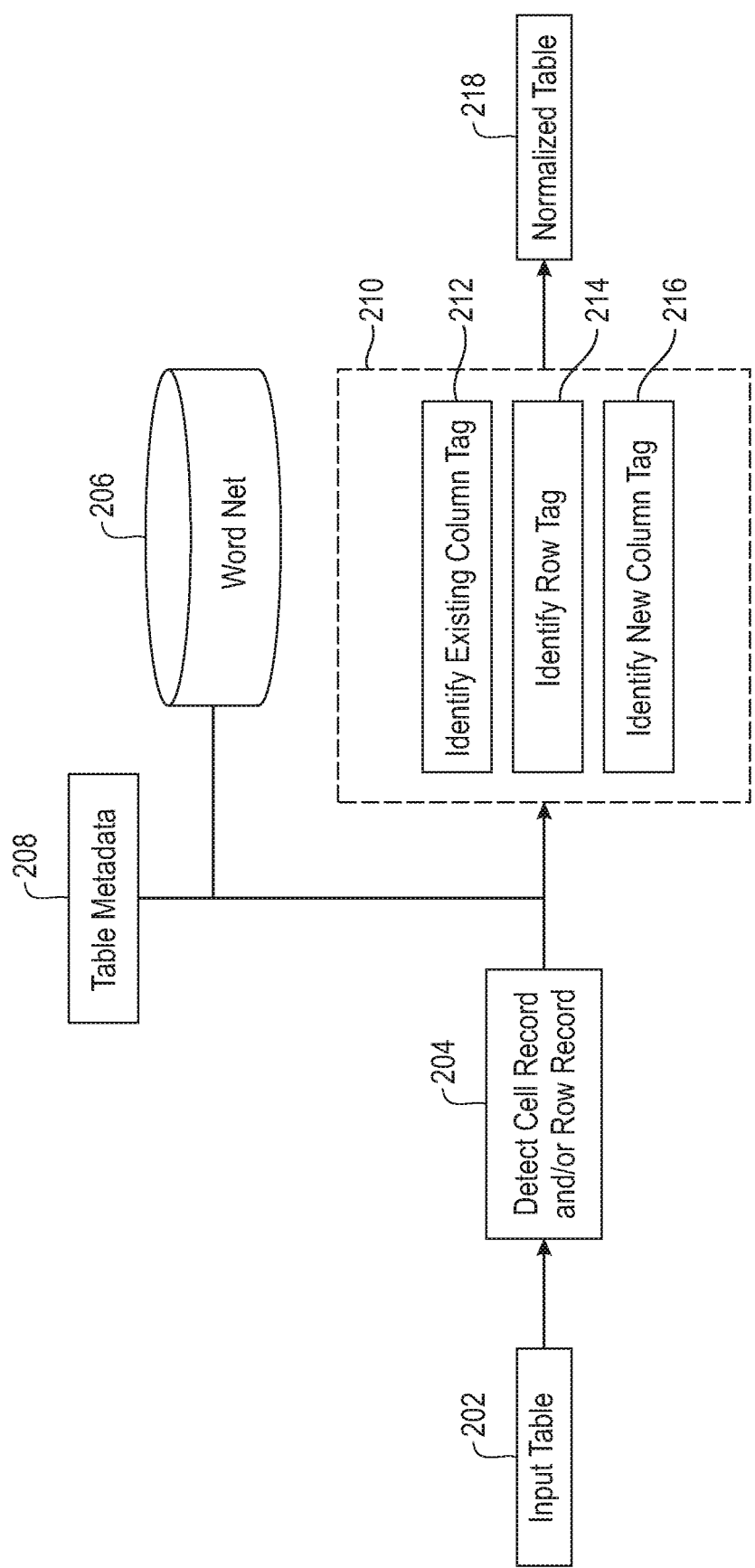
FIG. 2 is a diagram illustrating system architecture pertaining to normalization, according to an embodiment of the invention.

FIG. 2 is a diagram illustrating system architecture pertaining to normalization, according to an embodiment of the invention. By way of illustration, FIG. 2 depicts an input table 202, from which cell records and/or row records are detected via component 204. The detected records, along with table metadata 208 and data from a wordnet 206 (also referred to herein as Word Net) are provided as input to a normalization component 210. In such an embodiment, the wordnet represents a lexical database which captures relationships among words in various languages. The normalization component identifies existing column tag(s) in the inputs via component 212, identifies row tag(s) in the inputs via component 214, and identifies new column tag(s) in the inputs via component 216. Column identification tags can use the values in column headers along with semantic information available in the wordnet and table metadata to find an appropriate name for values in column headers. Row identification tags use row names along with semantic information available in the wordnet and table metadata to find an appropriate column names of all row names. Also, in one or more embodiments, column tag identification can include finding an appropriate name for cell values. Based at least in part on these tag identifications, the normalization component generates and outputs a normalized version of the table 218.

Referring again to FIG. 1, at least one embodiment includes performing table components alignment. In such an embodiment, tables and corresponding metadata are compared across documents to find aligned tables (e.g., one table can be aligned to one or more other tables). Once the tables are in a comparable structure (rendered, for example, via normalization techniques), the aligned tables are compared using one or more similarity measures such as a structural similarity measure, a metadata similarity measure, and/or an attribute similarity measure. A structural similarity can include finding or determining the overlap between header cells of the compared tables (StrSim). A metadata similarity measure can include using metadata such as, for example, table captions (CapSim) and section headers (SecSim), from the compared tables and identifying similarities therein. An attribute similarity measure can include finding the overlap between common attribute types (AttrSim) of table cells (e.g., currencies (dollar), date-time (months), etc.). Additionally, in at least one embodiment, an overall table similarity measure using a combination of such individual measures can be computed as follows:

$$TabSim(t1,t2)=\alpha*StrSim(t1,t2)+\beta*CapSim(t1,t2)+\gamma*SecSim(t1,t2)+\delta*AttrSim(t1,t2)$$

In the above equation, alpha, beta, gamma, and delta denote the weights provided to the various similarity metrics. Because the final table similarity depends on the given use case, such a formulation enables the user to weigh the different similarity measures and obtain a cumulative similarity score.

One or more embodiments can also include two-component-based structural normalization, wherein such normalization can include column alignment and column renaming steps. Additionally, at least one embodiment can include two-component-based value normalization, as tables can represent data in different notations. For example, one table can mention accuracy and another table can mention error rate. In such an embodiment value normalization techniques can include, for example, unit conversions (e.g., weights, distance, time, etc.), format conversions (e.g., date formatting), currency conversions, custom conversions (e.g., converting an accuracy measure to an error rate measure), etc.

As detailed herein, at least one embodiment further includes performing record comparisons (which can include, for example, record entity comparisons). In such an embodiment, each comparable table pair has a similar structure (as generated, for example, via the above-noted normalization techniques), and as such, a comparison can include finding and/or identifying comparable rows in the tables and subsequently comparing the identified rows to determine any similarities and/or differences.

One or more embodiments additionally include generating at least one contrast summary based on the comparison(s). Such a summary can include, for example, highlighting of new information (such as, for example, new rows, new columns, etc.) being added to one or more of the compared tables, and/or old information being deleted from one or more of the compared tables. Additionally, in at least one embodiment, wherever there is an updating of the information in one or more of the compared tables, a summary can be generated for that update. Further, at least one embodiment can include generating a context-based information update summary, wherein important and/or target information is identified used as a basis for a summary. In an example embodiment wherein multiple information update summaries are generated, the summaries can be ranked and the top k highlights from the summaries can be displayed and/or output.

As also detailed herein, one or more embodiments include generating analytically-based insights derived from the comparisons and/or generated summaries related thereto. In such an embodiment, one or more analytical models can be utilized in connection with the comparisons, and one or more summaries can be generated based on the application of such models. For example, such analytical models can include value-based contrast models, distribution-based contrast models, and/or aggregate-based contrast models (related, for example, to variables such as change in total sales, new sales, etc.).

By way merely of illustration, consider an example use case wherein two tables (Table1 and Table2) display the results of text classification for different models on varied datasets. Table1 reports testing errors, whereas Table2 reports test accuracy (wherein both values are in percentage form). An example embodiment can include converting those values to the same unit (for example, converting testing error values to accuracy values by subtracting the numbers from 100). Accordingly, in such an example, after the conversion, Row 1 in Table1 would be aligned to Row 1 in Table2, and Row 3 in Table1 would be aligned to Row 2 in Table2. Based on a comparison of the aligned table data, one or more insights can be generated such as, for example, the accuracy for a given dataset using an n-gram model increased from 97.08 to 97.1 from Table1 to Table2.

Figure 3:
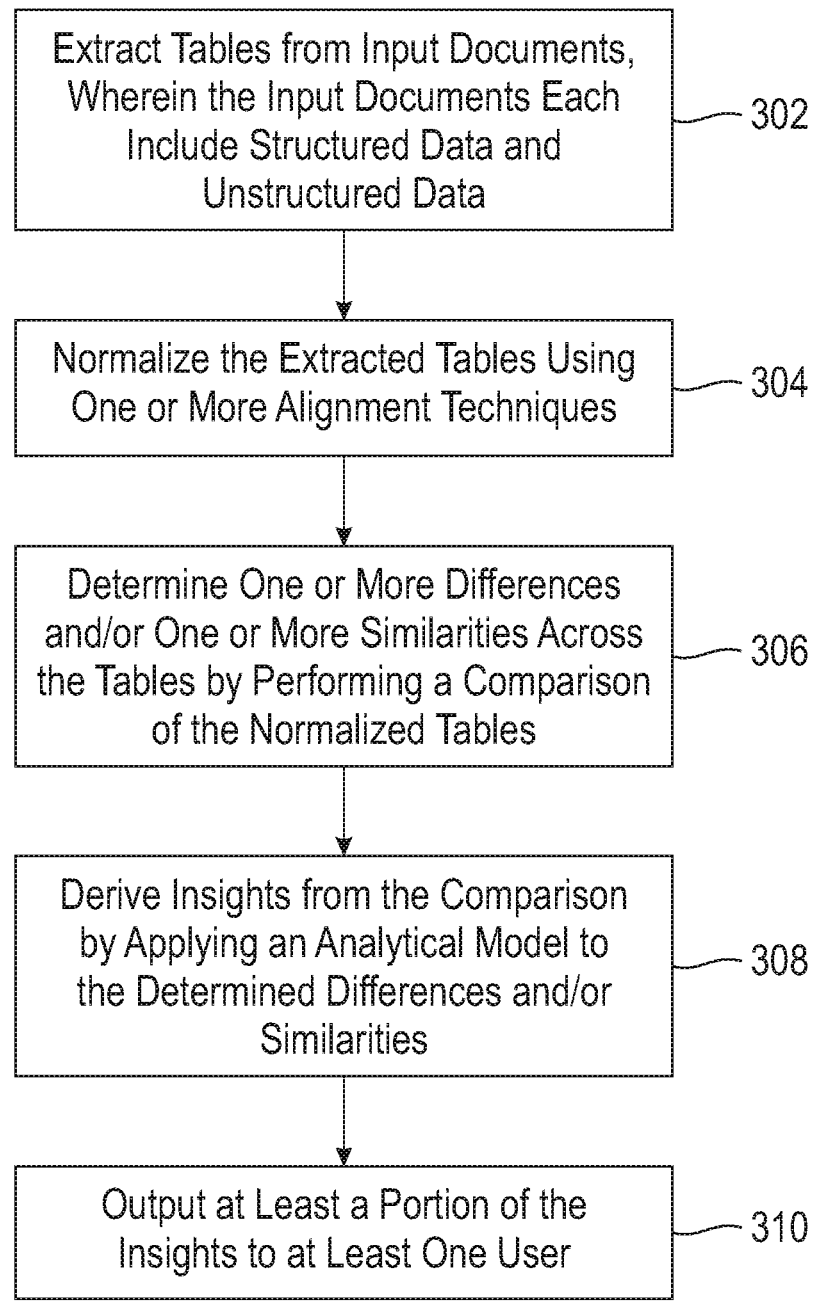
FIG. 3 is a flow diagram illustrating techniques according to an embodiment of the invention.

FIG. 3 is a flow diagram illustrating techniques according to an embodiment of the present invention. Step 302 includes extracting two or more tables from two or more input documents, wherein each of the two or more input documents comprises structured data and unstructured data. Extracting can include preserving (i) one or more formatting parameters of each of the two or more extracted tables and/or (ii) one or more structural parameters of each of the two or more extracted tables.

Step 304 includes normalizing the two or more extracted tables using one or more alignment techniques. Normalizing can include performing one-table normalization by converting a given one of the two or more extracted tables into a normalized form, performing table alignment by comparing the given normalized table to at least one of the two or more extracted tables, and carrying out two-table normalization by performing column alignment and column renaming across the extracted tables compared in connection with said table alignment.

Also, in one or more embodiments, using one or more alignment techniques can include aligning structured data in the two or more extracted tables by comparing structured data and unstructured data across the two or more extracted tables. Additionally, in at least one embodiment, normalizing includes performing value normalization using the aligned structured data, wherein performing value normalization includes representing at least a portion of multiple values in the aligned structured data using the same unit.

Step 306 includes determining at least one of (i) one or more differences and (ii) one or more similarities across the two or more extracted tables by performing a comparison of the two or more normalized tables. Performing the comparison can include comparing the two or more normalized tables using at least one similarity measure. Using such similarity measures can include using a structural similarity measure to determine at least one overlap between header cells of the two or more normalized tables; using a metadata similarity measure to identify one or more similarities among the metadata from the two or more normalized tables; and/or using an attribute similarity measure to determine at least one overlap between one or more attribute types of table cells across the two or more normalized tables.

Step 308 includes deriving one or more insights from the comparison by applying at least one analytical model to the at least one of the one or more determined differences and one or more determined similarities. Deriving one or more insights can include identifying (i) information added to at least one of the two or more extracted tables, (ii) information deleted from at least one of the two or more extracted tables, and/or (iii) information updated in at least one of the two or more extracted tables.

Step 308 includes outputting at least a portion of the one or more insights to at least one user.

Additionally or alternatively, one or more embodiments can include extracting two or more tables from two or more input documents, wherein each of the two or more input documents includes structured data and unstructured data, and wherein extracting includes preserving (i) one or more formatting parameters of each of the two or more extracted tables and (ii) one or more structural parameters of each of the two or more extracted tables. Such an embodiment also includes normalizing the two or more extracted tables by comparing the structured data and the unstructured data across the two or more extracted tables to align the structured data in the two or more extracted tables. Such an embodiment additionally includes determining at least one of (i) one or more differences and (ii) one or more similarities across the two or more extracted tables by performing a comparison of the two or more normalized tables by comparing the two or more normalized tables using multiple measures. Further, such an embodiment includes deriving one or more insights from the comparison by applying at least one analytical model to the at least one of the one or more determined differences and one or more determined similarities, and performing at least one automated action based at least in part on the one or more insights.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
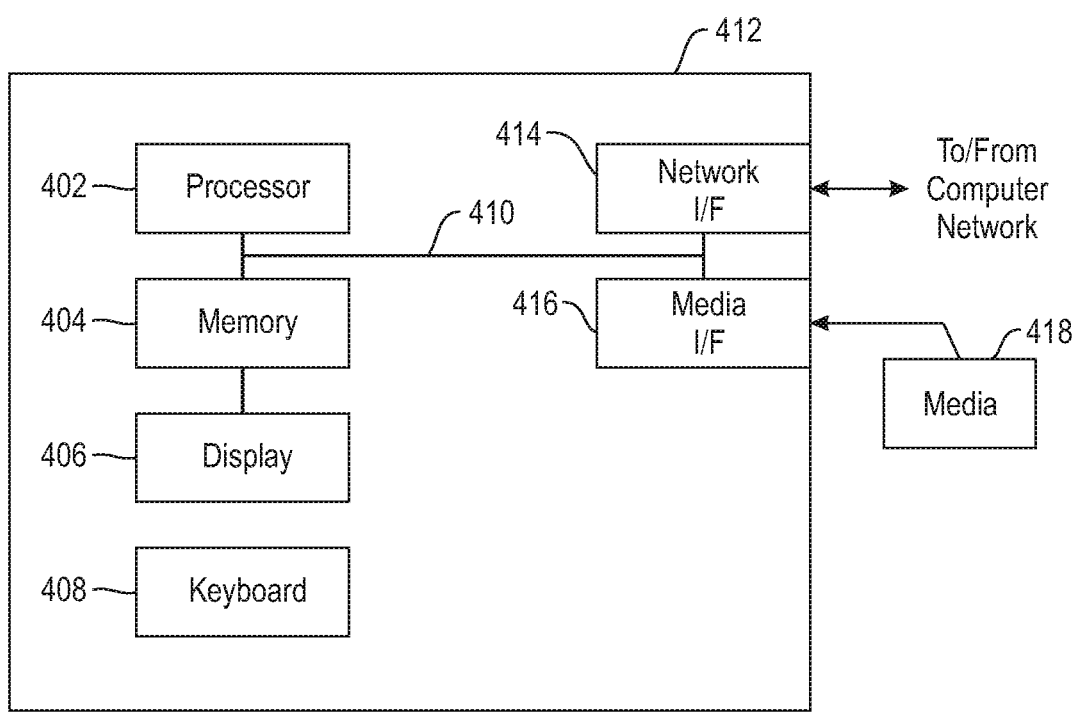
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit)

and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and an input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
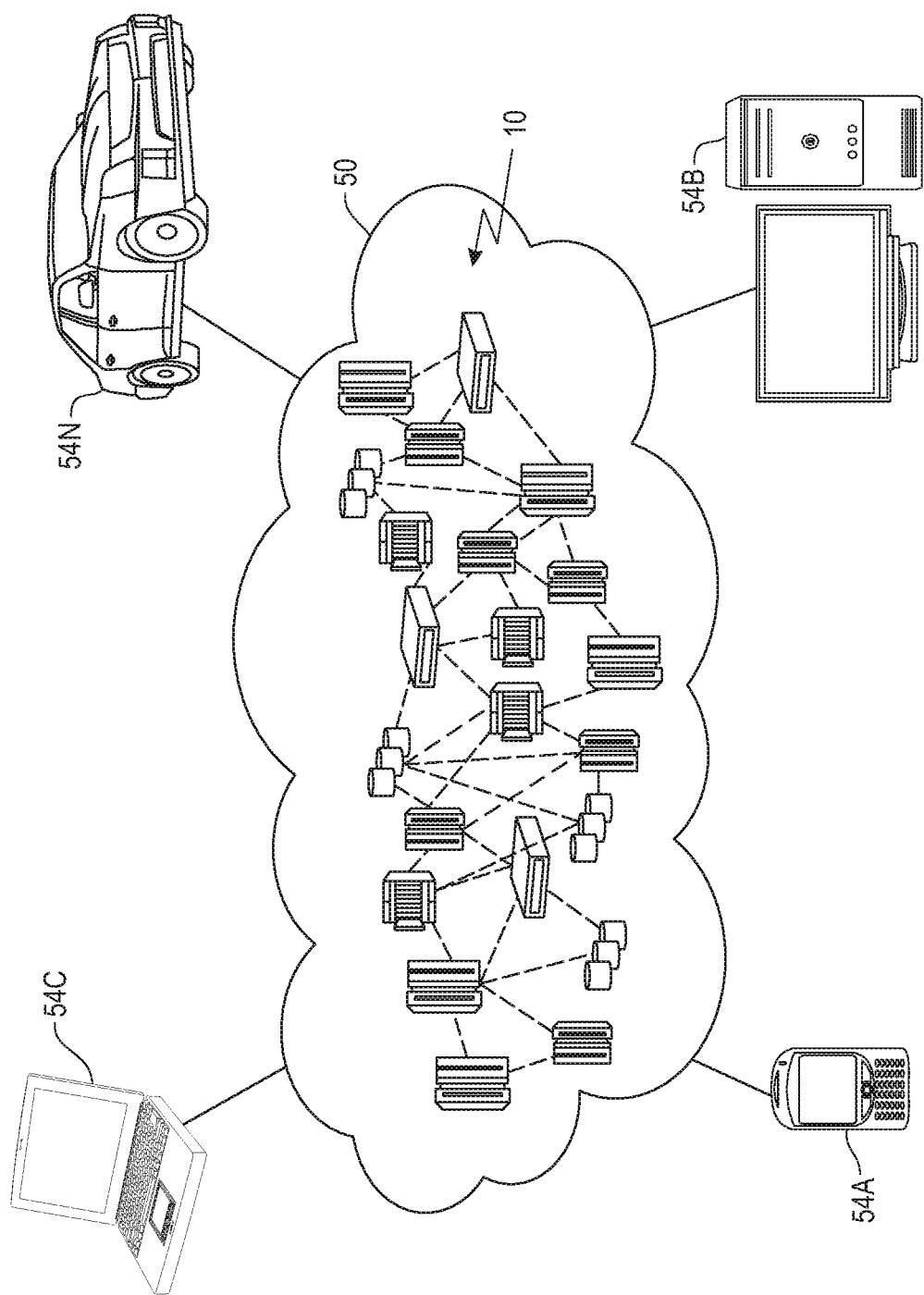
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
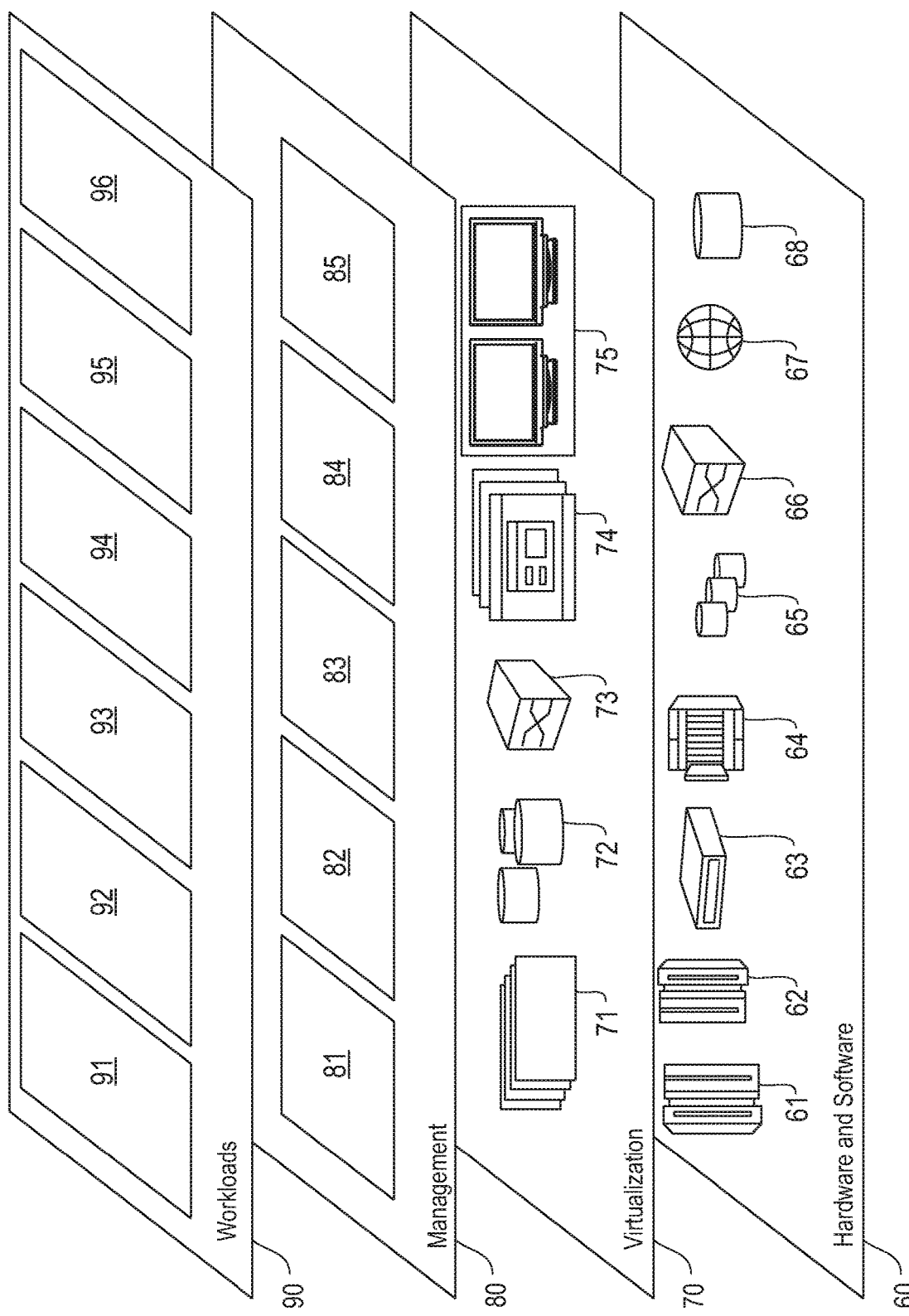
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and document analysis 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, performing structure and value normalization-based data comparisons across multiple tables, and deriving data-related insights from the comparisons.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   extracting two or more tables from two or more input documents, wherein each of the two or more input documents comprises structured data and unstructured data;
   normalizing the two or more extracted tables using one or more alignment techniques, wherein said normalizing comprises performing one-table normalization by converting a given one of the two or more extracted tables into a normalized form, performing table alignment by comparing the given normalized table to at least one of the two or more extracted tables, and carrying out two-table normalization by performing column alignment and column renaming across the two or more extracted tables compared in connection with said table alignment;
   determining (i) one or more differences and (ii) one or more similarities across the two or more extracted tables by performing a comparison of the two or more normalized tables, wherein said performing the comparison comprises comparing the two or more normalized tables using at least one similarity measure that sums (a) a structural similarity metric measuring overlap between column header cells of the two or more normalized tables, (b) a metadata similarity metric measuring similarities among the metadata from the two or more normalized tables, and (c) an attribute similarity metric measuring overlap between one or more attribute types of table cells across the two or more normalized tables, wherein each of the structural similarity metric, the metadata similarity metric, and the attribute similarity metric is weighted in conjunction with user-defined weights;
   deriving one or more insights from the comparison by applying at least one analytical model to the one or more determined differences and one or more determined similarities; and
   outputting at least a portion of the one or more insights to at least one user;
   wherein the method is carried out by at least one computing device.

2. The computer-implemented method of claim 1, wherein said using one or more alignment techniques comprises aligning structured data in the two or more extracted tables by comparing structured data and unstructured data across the two or more extracted tables.

3. The computer-implemented method of claim 2, wherein said normalizing comprises performing value normalization using the aligned structured data.

4. The computer-implemented method of claim 3, wherein performing value normalization comprises representing at least a portion of multiple values in the aligned structured data using a same unit.

5. The computer-implemented method of claim 1, wherein said extracting comprises preserving at least one of (i) one or more formatting parameters of each of the two or more extracted tables and (ii) one or more structural parameters of each of the two or more extracted tables.

6. The computer-implemented method of claim 1, wherein said deriving one or more insights comprises identifying at least one of (i) information added to at least one of the two or more extracted tables, (ii) information deleted from at least one of the two or more extracted tables, and (iii) information updated in at least one of the two or more extracted tables.

7. A computer program product comprising a non-transitory computer readable storage medium having program instructions embodied therewith, the program instructions executable by a computing device to cause the computing device to:
   extract two or more tables from two or more input documents, wherein each of the two or more input documents comprises structured data and unstructured data;
   normalize the two or more extracted tables using one or more alignment techniques, wherein said normalizing comprises performing one-table normalization by converting a given one of the two or more extracted tables into a normalized form, performing table alignment by comparing the given normalized table to at least one of the two or more extracted tables, and carrying out two-table normalization by performing column alignment and column renaming across the two or more extracted tables compared in connection with said table alignment;
   determine (i) one or more differences and (ii) one or more similarities across the two or more extracted tables by performing a comparison of the two or more normalized tables, wherein said performing the comparison comprises comparing the two or more normalized tables using at least one similarity measure that sums (a) a structural similarity metric measuring overlap between column header cells of the two or more normalized tables, (b) a metadata similarity metric measuring similarities among the metadata from the two or more normalized tables, and (c) an attribute similarity metric measuring overlap between one or more attribute types of table cells across the two or more normalized tables, wherein each of the structural similarity metric, the metadata similarity metric, and the attribute similarity metric is weighted in conjunction with user-defined weights;
   derive one or more insights from the comparison by applying at least one analytical model to the one or more determined differences and one or more determined similarities; and
   output at least a portion of the one or more insights to at least one user.

8. A system comprising:
   a memory; and
   at least one processor operably coupled to the memory and configured to:
      extract two or more tables from two or more input documents, wherein each of the two or more input documents comprises structured data and unstructured data;
      normalize the two or more extracted tables using one or more alignment techniques, wherein said normalizing comprises performing one-table normalization by converting a given one of the two or more extracted tables into a normalized form, performing table alignment by comparing the given normalized table to at least one of the two or more extracted tables, and carrying out two-table normalization by performing column alignment and column renaming across the two or more extracted tables compared in connection with said table alignment;
      determine (i) one or more differences and (ii) one or more similarities across the two or more extracted tables by performing a comparison of the two or more normalized tables, wherein said performing the comparison comprises comparing the two or more normalized tables using at least one similarity measure that sums (a) a structural similarity metric measuring overlap between column header cells of the two or more normalized tables, (b) a metadata similarity metric measuring similarities among the metadata from the two or more normalized tables, and (c) an attribute similarity metric measuring overlap between one or more attribute types of table cells across the two or more normalized tables, wherein each of the structural similarity metric, the metadata similarity metric, and the attribute similarity metric is weighted in conjunction with user-defined weights;

derive one or more insights from the comparison by applying at least one analytical model to the one or more determined differences and one or more determined similarities; and output at least a portion of the one or more insights to at least one user.

\* \* \* \* \*